United States Patent [19]

Hidaka

[11] 4,023,173

[45] May 10, 1977

[54] OBJECT DISCERNING METHOD AND APPARATUS USING A SPATIAL WAVE PROPAGATION

[75] Inventor: Takehiko Hidaka, Tokyo, Japan

[73] Assignee: Agency of Industrial Science & Technology, Tokyo, Japan

[22] Filed: Sept. 11, 1975

[21] Appl. No.: 612,493

[30] Foreign Application Priority Data

Sept. 12, 1974 Japan .............................. 49-104324

[52] U.S. Cl. .................................. 343/17; 340/1 R; 340/5 H

[51] Int. Cl.$^2$ ........................ G01S 7/04; G01S 7/56

[58] Field of Search ................ 340/5 MP, 5 H, 3 A; 343/17; 332/7.51

[56] References Cited

UNITED STATES PATENTS

| | | | |
|---|---|---|---|
| 2,408,436 | 10/1946 | Mason | 340/6 R |
| 2,658,186 | 11/1953 | Mason | 340/6 R |
| 3,889,226 | 6/1975 | Hildebrand | 340/5 H |

*Primary Examiner*—Richard A. Farley

*Attorney, Agent, or Firm*—Kurt Kelman

[57] ABSTRACT

Disclosed is a method and apparatus for holographically discerning an object, using any kind of coherent wave such as microwave, millimeter wave, or sound wave. An asymmetric, dispersive medium is so positioned that some of the coherent wave scattered by the object may fall on the dispersive medium. The scattered wave passing through the medium falls on a stationary receiving antenna, and then the so received wave interferes with the reference wave to produce an interference pattern. The refraction of the scattered wave at the dispersive medium varies with the frequency of the wave and, therefore, the scattered wave impinging on the stationary antenna leaves from different positions on the dispersive medium if the frequency of the coherent wave used is varied. Thus, the interference patterns will be obtained for three-dimensional discernment of the object simply by changing the frequency of the coherent wave instead of moving the receiving antenna or the intervening medium as is done in the conventional holographic system.

13 Claims, 10 Drawing Figures

OBJECT DISCERNING METHOD AND APPARATUS USING A SPATIAL WAVE PROPAGATION

BACKGROUND OF THE INVENTION

This invention relates to a method and apparatus for holographically discerning an object, using any kind of coherent wave such as electromagnetic wave or sound wave, and more particularly to such a method and apparatus in which some of the coherent waves scattered in all directions by the object are detected at a fixed point for a three-dimensional or holographic discernment of the object.

Holographic techniques have been known as a means for a three-dimensional discernment and visible reconstruction of an object. A coherent wave scattered by the object is made to interfere with a reference coherent wave to produce an interference pattern. A three-dimensional image of the object will result from the interference pattern. Also, the interference pattern can be recorded and stored for the later reconstruction of the three-dimensional image of the object. The interference pattern is generally called a "holograph." In case where a coherent wave in the range of visible rays is used to produce holographs, a photographic film can be advantageously used. However, where a microwave is used to produce holographs, disadvantageously there is no means to record the whole image of the object at the same time as can be done in the recording of the image on a photographic film.

In this connection in producing microwave-holographs there have been hitherto used means to mechanically move a receiving antenna to sweep as broad an area as required in the form of lines or dots. Otherwise, there has been used a two-dimensional array of numerous antennas to cover as broad an area as required, and with this arrangement the outputs of these antennas are sequentially picked up by a proper electronic switching means to construct a spatial interference pattern.

As for the former means to mechanically move a receiving antenna, a complicated mechanism is required, and still disadvantageously it takes much time to produce a single holograph. Therefore, the former method is practically useless. As for the latter means, it requires many antennas units built in the form of array, and from the point of economy it lacks practicality. There has hitherto been no practical method using a microwave to holographically discern an object in a three-dimensional way.

The object of this invention is to provide a method and apparatus using a coherent wave other than visible rays, such as an electromagnetic wave (microwave, or millimeter wave), a sound wave (ultrasonic wave) or a beam of electrons for a three-dimensional discernment of an object.

SUMMARY OF THE INVENTION

To attain this object a method of discerning an object using spatial wave propagation according to this invention comprises the steps of: directing a coherent wave to the object to cause scattering of the wave by the object and impinging the same on an asymmetric "dispersive" medium changing the frequency of the coherent wave or the refraction of the medium; detecting sequentially at a fixed position a series of dispersive waves passed through the medium; and causing the so-detected dispersive waves to interfere with a reference coherent wave to produce a corresponding series of interference patterns for a three-dimensional discernment of the object. According to this invention either continuous changing (or sweeping) of the frequency of the coherent wave or direct-changing of the refractive index of the asymmetric medium per se will cause a series of dispersive waves to leave different positions of the medium surface for a stationary antenna at a fixed position. This is functionally equivalent to the mechanical sweeping of an antenna on the intervening plane or the electronic switching and sequential picking-up of the outputs of numerous antennas arranged in the form of an array.

As is apparent from the above, the method and apparatus according to this invention are very simple, compared with the conventional method and apparatus using a coherent wave other than visible rays for the three-dimensional discernment and visible reconstruction of an object.

The word "dispersive" herein used to modify the word "medium" should be understood to mean that the apparent refractive index of the medium varies with the frequency of the coherent wave passing through the medium.

BRIEF DESCRIPTION OF THE DRAWING

This invention will be better understood from the following description of preferred embodiments with reference to the accompanying drawings.

DETAILED EXPLANATION OF THE INVENTION

Figure 1:
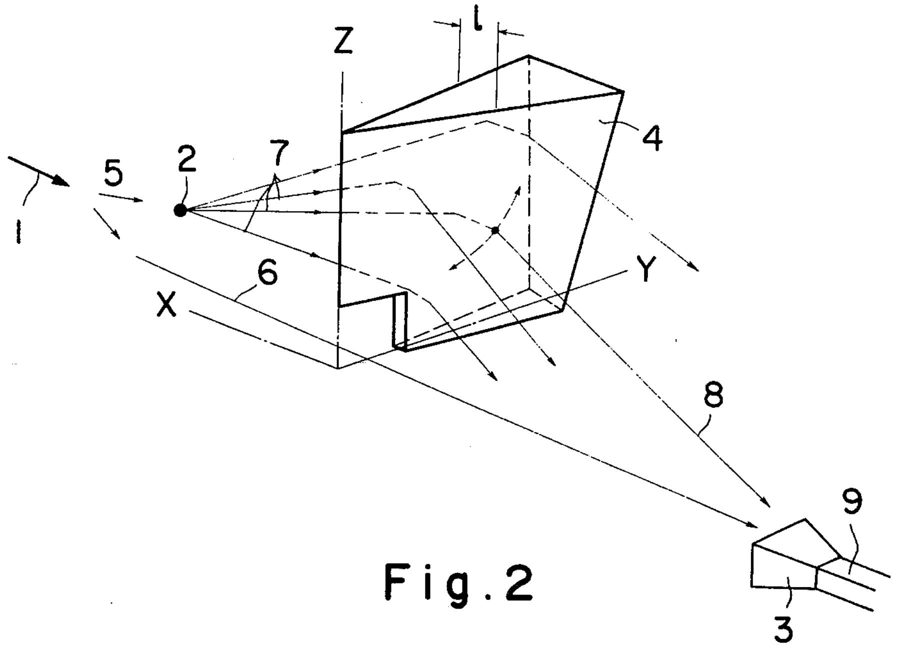
FIGS. 1 to 3 show the principle according to which the apparatus of this invention functions.

Referring to FIG. 1, the principle according to which an image producing apparatus of this invention operates, is described as follows. A coherent wave 1 from a radiation source (not shown) is divided into two, one of which is a first coherent wave 5 directed to an object 2 whose image is to be produced and the other one of which is a second coherent wave 6 used as a reference wave. The first coherent wave 5, when falling on the object 2, will be scattered, and different scattered waves 7 impinge on a "dispersive" medium 4 which is composed of an asymmetric prism in this particular embodiment. (The prism is asymmetric with regard to Y and Z axes.) On the other hand the second and reference wave impinges directly on a stationary antenna 3. The scattered waves 7, when impinging on the prism, will be dispersed in all directions because of the "dispersive" nature of the asymmetric prism. Only one dispersive wave 8 impinges on the stationary antenna 3 to cause interference with the reference wave 6.

Assume that the thickness $l$ of the asymmetric wave is equal to $A(K+z_o)y_o$, where $k$ is a parameter representing the "asymmetricity" and $A$ is a constant. The coordinate at which the dispersive wave 8 passes through the asymmetric prism to impinge on the stationary antenna, is given by the Fermat principle as follows:

$$y_o = \left\{ \left[ (1-n)Ak + \frac{y}{x} \right] \left( \frac{1}{x} + \frac{1}{x_R} \right) + (1-n)A\frac{z}{x} \right\} / \Delta \quad (1)$$

$$z_o = \left\{ (1-n)A\frac{y}{x} + \left( \frac{1}{x} + \frac{1}{x_2} \right) \frac{z}{x} + (1-n)^2 A^2 k \right\} / \Delta$$

$$\Delta = \left( \frac{1}{x} + \frac{1}{x_R} \right)^2 - (1-n)^2 A^2$$

where $X_R$ is the distance between the stationary antenna and the plane of the prism facing the antenna, and $n$ is a refractive index of the prism which varies with the frequency of the coherent wave used.

Accordingly the coordinate at which the dispersive wave 8 passes through the prism 4 to impinge on the stationary antenna 3, will vary with the frequency of the coherent wave as indicated by the dash-and-dot line in FIG. 1.

The path difference $\Delta L$ between the reference wave 6 and the dispersive wave to impinge on the stationary prism is given by:

$$\Delta L = \frac{(y_o - y)^2}{2x} + \frac{(z_o - z)^2}{2x} - (1-n)l + \frac{y_o^2 + z_o^2}{2x_R} \quad (2)$$

Accordingly, the output signal $H(\omega)$ of a detector 9 which is attached to the antenna is given by:

$$H(\omega) = \int_{x,y,z} e^{-j\frac{\omega}{c}\Delta L} g(x,y,z)\, dx \cdot dy \cdot dz \quad (3)$$

where $g(x, y, z)$ shows the object, $\int dxdydz$ is a triple integral of a function $g$ of the coordinates $x$, $y$ and $z$ of the object, $c$ is a ray velocity, $e$ is an exponential function, $j$ is an imaginary number and $\omega$ is angular frequency.

The operation according to which an image of the object is produced from the output signal $H(\omega)$, which is as follows:

The Fourier conversion of the output $H(\omega)$ is given by:

$$I(x',y',z') = \int_\omega H(\omega) e^{+j\frac{\omega}{c}\Delta L'} d\omega \quad (4)$$

wherein I $(x',y',2')$ is the result of Fourier conversion of $H(\omega)$, and $\Delta L'$ is the path difference between the reference wave and the dispersive wave to impinge on the stationary antenna if $x$, $y$ and $z$ are close to $x'$, $y'$ and $z'$. If the equation (3) is put in the equation (4) as a substitute for $H(\omega)$, the following will result:

$$\int_\omega H(\omega) e^{+j\frac{\omega}{c}\Delta L'} d\omega \quad (5)$$

$$= \int_{x,y,z} y(x,y,z) \int_\omega e^{+j\frac{\omega}{c}(\Delta L' - \Delta L)} d\omega \cdot dx \cdot dy \cdot dz$$

-continued $$\int_\omega e^{+j\frac{\omega}{c}(\Delta L' - \Delta L)} d\omega$$

is assigned not to be zero only when $\Delta L' \equiv \Delta L$ holds independent of frequency. The condition in which $\Delta L' \equiv \Delta L$ holds independent of frequency is that $x' \equiv x$, $y' \equiv y$, and $z' \equiv z$ hold at all times. This is because the path difference $\Delta L$ is asymmetric with regard to $x$, $y$ and $z$ and is a function of frequency because of the frequency dependent refractive index $n$ of the prism. The asymmetry of $L$ implies that the expression of equation (2) will be different from the original one if $y$ and $z$ in $\Delta L$ are changed to each other. With a view to endowing the system with this asymmetry, an asymmetric dispersive medium is used, and this idea constitutes the essence of the present invention.

Now, assume that $x \equiv x'$, $y \equiv y'$ and $z \equiv z'$ hold. The equation (5) will be:

$$g(x,y,z) = \int_\omega H(\omega) e^{+j\frac{\omega}{c}\Delta\omega} d\omega \quad (6)$$

Thus, an image of the object $g(x, y, z)$ is produced from the output signal $H(\omega)$ of the detector (9). This arithmetic operation can be easily performed by an electronic computer.

Figure 2:
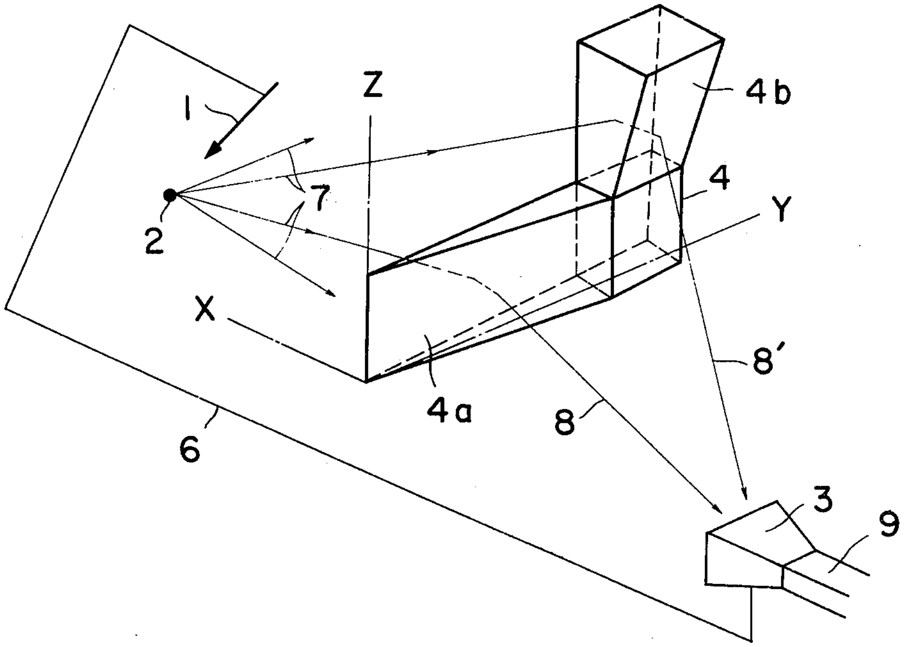

Referring to FIG. 2 the principle of this invention will be explained in comparison with the holography principle. Only for the sake of simplicity an object 2 is assumed to be a given point at the coordinate $(x, y, z)$. The asymmetric prism 4 used includes a slant region 4a in the Y-axis direction and another slant region 4b in the Z-axis direction. A coherent wave 1 at frequency $f_o$ is allowed to impinge on the object 2, and some scattered waves 7 are directed to the whole area of the prism facing the object, and these scattered waves will be again dispersed in all directions in the prism. Only a single dispersive wave 8 at a particular point in the area 4a of the prism 4 will fall on the stationary antenna 3. Now, assume that the frequency $f_o$ of the coherent wave is continuously varied. The point at which the coherent wave passes through the prism to impinge on the stationary prism, will accordingly vary on the region 4a of the prism in the Y-axis direction because the prism is "dispersive" in nature, and the region 4a of the prism is slanted in the Y-axis direction. Thus, the point at which a particular dispersive wave passes through the prism will vary with the continuous change or sweeping of the frequency of the coherent wave, moving in the Y-axis direction. This is functionally equivalent to continuously changing the position of a receiving antenna on the region 4a of the prism in the Y-axis direction in such a way that the receiving antenna may sequentially pick up different dispersive waves from the object, as is the case with the conventional holographic apparatus.

As mentioned above, a single stationary antenna can receive pieces of holographic information of an object in the Y-axis direction by sweeping the frequency of coherent wave, thus determining the $y$ and $x$ ordinates of the object. If the frequency of the coherent wave is still varied, the start point of the path 8 of dispersive wave is shifted to the region 4b of the prism. This region is slanted in the Z-axis direction, and therefore the point of the path 8' of dispersive wave moves in the Z-axis direction, thus allowing the antenna to receive pieces of holographic information in the Z-axis direction. Thus, the $z$(and $x$) ordinates of the object 1 are determined. In this way the three dimensional form ($x$, $y$, $z$) of an object 1 can be easily determined, recorded and reproduced by using a single stationary antenna and an asymmetrical (or "dispersive") medium, and by continuously changing the frequency of the coherent wave.

Figure 4:
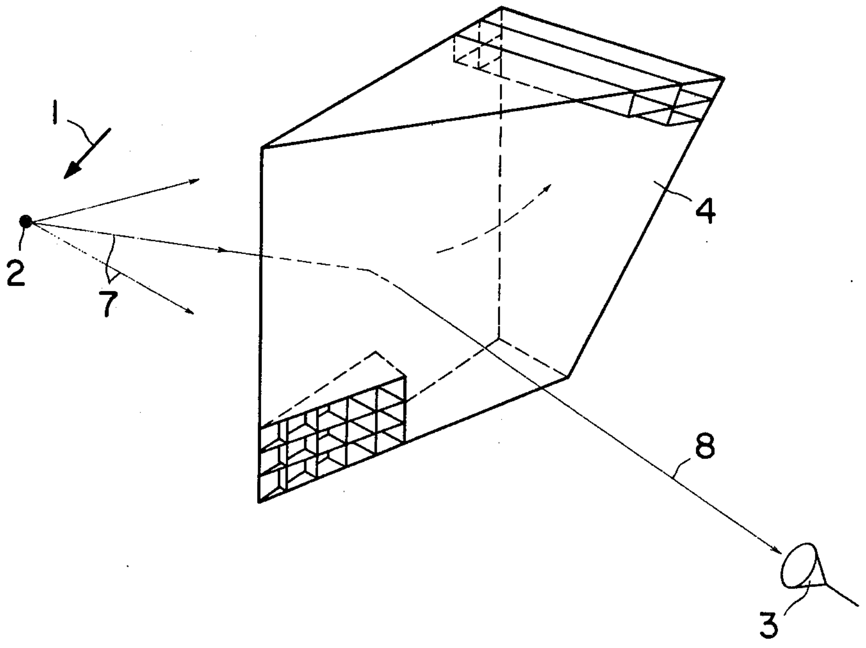
FIG. 4 is an explanatory view showing a first embodiment according to the present invention.

Any kind of coherent wave such as microwave, millimeter wave, sound wave or electron rays may be used. The source of radiation, the frequency-sweeping apparatus and the receiving antenna are well known, and therefore it is unnecessary to describe these apparatuses in detail. It is preferable to use a frequency-sweeping oscillator comprising both a radiation source and a frequency-sweeping apparatus. The "dispersive" medium used depends on the kind of coherent wave used. For instance, if a microwave or millimeter wave is used, an array of wave guides of different length as shown in FIG. 4 may be used as the "dispersive" medium. Otherwise, barium titanate or other dielectric material in appropriate shape may be used in place of the array of wave guides. If a supersonic wave is used, a diffraction grating is preferably used as the "dispersive" medium. If an electron beam is used, a magnetic lens system is advantageously used. The shape of the medium is determined from the kind of coherent wave, the frequency sweeping range, the size and kind of object to be discerned, the length of the wave-traveling paths and other parameters. The frequency sweeping range determines the degree of detail with which the object can be determined, and in general the degree of detail obtainable will rise as the frequency sweeping range is broadened. Ordinarily, the shape of the "dispersive" medium and the design of the antenna determine inherently from the kind of the coherent wave used, the frequency sweeping range, the degree of detail required, the length of the wave propagation and other factors.

As for the direction in which the coherent wave impinges on the object, the coherent wave is shown as impinging on the back or rear side of the object in FIG. 1 only for the sake of making the idea of this invention easily understood. In actual practice, it is necessary to cause the reflected wave from the object to impinge on the "dispersive" medium. In this connection, the coherent wave is directed to the object from such a place that the coherent wave impinges on the front part of the object, as shown in FIG. 2. The reference wave may be directed to the stationary antenna via free space, as shown in FIG. 1. Alternatively it may be transmitted to the receiving antenna via a co-axial cable or the like, as shown in FIG. 2.

Figure 3:
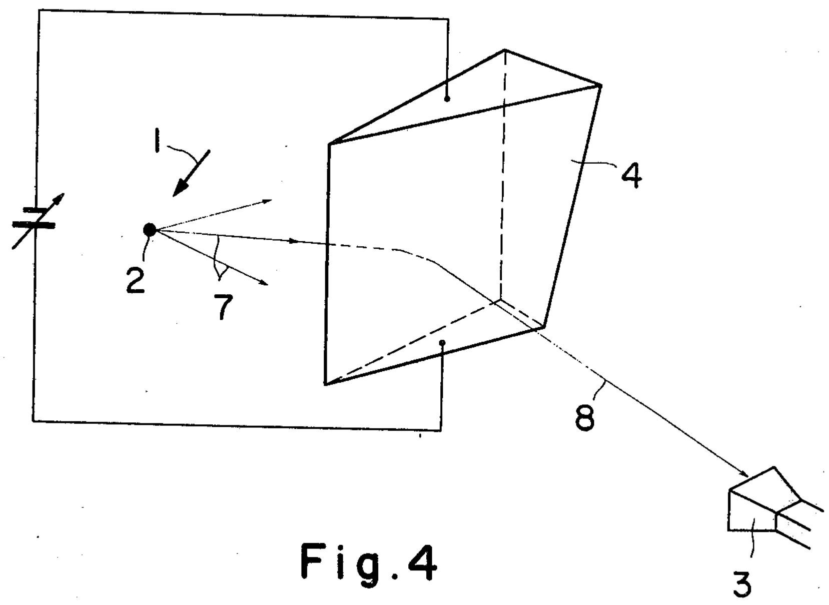

In the embodiments above mentioned, the control of the refractive index of the "dispersive" medium is performed by sweeping or continuously changing the frequency of the coherent wave. Contrary to this, the same control may be performed by electrically or mechanically changing the refractive index of the dispersive medium per se. As shown in FIG. 3, an asymmetrically shaped piece of barium titanates or other dielectric material 4 may be used as the "dispersive" medium. A coherent wave 1 at a given constant frequency is directed onto the object 2, and a selected dispersive wave is allowed to impinge on the "dispersive" medium. A voltage is applied to the "dispersive" medium and the magnitude thereof changes gradually, with the frequency of the coherent wave remaining constant. As a result the refractive index of the "dispersive" medium varies accordingly, and the length of the path which the dispersive wave must travel before impinging on the receiving antenna varies accordingly.

Thus, the same effect as caused by sweeping the frequency of the coherent wave in the previous embodiments will be caused, thus allowing three dimensional determination of the object.

Referring to FIG. 1 again, the three dimensional determination of an object in case of using a microwave or a millimeter wave will be described in detail. The whole system is constructed as shown in FIG. 1. A microwave or millimeter wave oscillator is used as a source of radiation. Preferably a conventional frequency-sweeping type oscillator is used. As an example of the "dispersive" medium, there may be used as asymmetric array of different wave guides whose lengths increase in the directions of both the Y and z-axes, as best shown in FIG. 4. Alternatively, asymmetric shaped barium titanate may be used as the "dispersive" medium, making use of the high refractory index of the material with respect to microwaves.

With this arrangement, a microwave or millimeter wave 1 is directed from the oscillator to an object 2 to be discerned, and the wave is scattered upon falling on the object. Some of the so-scattered wave 7 impinges on the "dispersive" medium 4. On the other hand the same microwave or millimeter wave (reference wave) is transmitted to a stationary antenna via a coaxial cable (not shown). The dispersive wave impinging on the medium 4 is again scattered, and a particular one 8 of the so-scattered waves impinges on the stationary antenna 3 to cause interference with the reference wave. The frequency of the wave is continuously changed by the frequency-sweeping apparatus of the oscillator with the result that the length of the travelling path of a dispersive wave to the stationary antenna changes on the "dispersive" medium as indicated by the dot line in the drawing, thus allowing the three dimensional shape ($x$, $y$, $z$) of the object to be discerned. If a metal object is contained in a casing, the object can be discerned in non-contact way.

Figure 5:
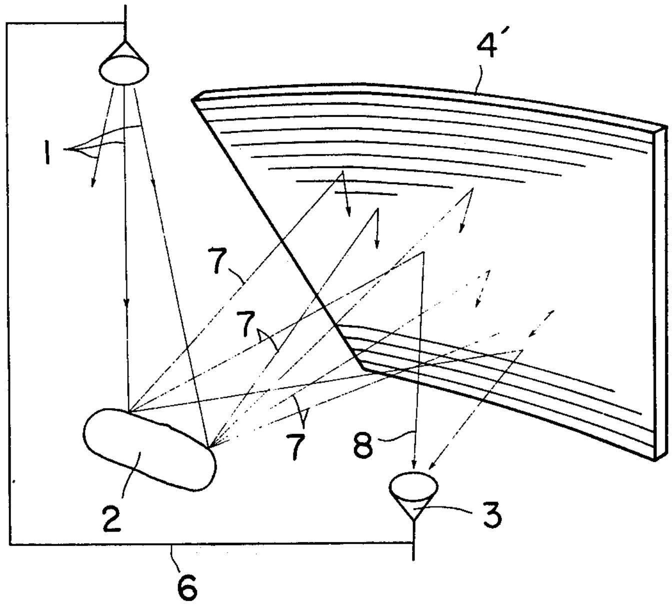
FIGS. 5 and 6 show a second embodiment according to this invention.
Figure 6:
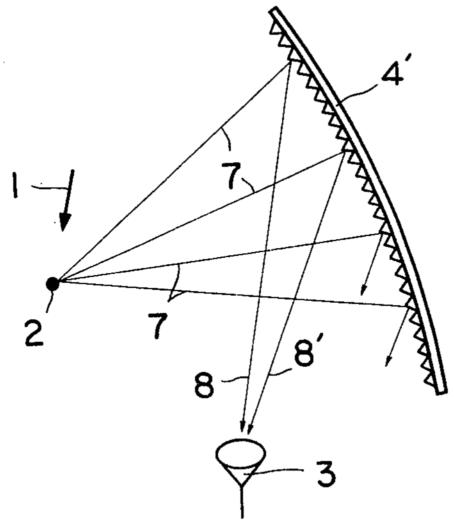

Referring to FIG. 5, the method of this invention using an ultrasonic wave to discern an object, is described below. A strong ultrasonic wave at as high a frequency as desired can be produced by well known ultrasonic wave techniques. A diffraction grating is advantageously used as an asymmetric "dispersive" medium. The ultrasonic wave 1 is generated and directed to an object 2. When impinging on the object, the wave 7 is scattered, and some of the so-scattered waves impinge on the diffraction grating 4′, thus causing the diffraction of the dispersive waves. Some of the so-diffracted waves impinge on a receiving antenna 3. The position from which the dispersive wave 8′ impinging on the antenna is reflected will vary with the frequency of the ultrasonic wave, as shown in FIG. 6. Thus, the three dimensional shape of the object can be discerned by sweeping the frequency of the ultrasonic wave. If an ultrasonic wave is used, an object in deep water can easily be discerned.

Figure 7:
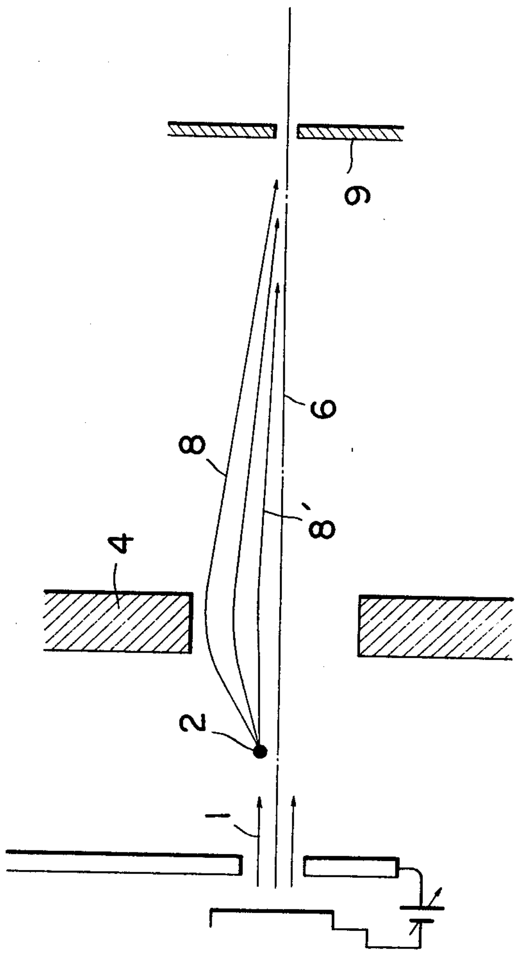
FIG. 7 shows a third embodiment according to this invention.

Referring to FIG. 7, there is shown an embodiment using a beam of electrons as a spatial propagation. The wave length λ(A) of the electron beam is given by:

$$\lambda(A) = 150/V$$

wherein V is the accelerating voltage (volts).

As is apparent from this equation, the wave length or frequency of the electron beam can be continuously changed by controlling the accelerating voltage.

As shown in FIG. 7, an electron beam 1 is scattered by an object 2, and if the electrons are accelerated at a relatively low voltage, the path of the electron beam 8 to the aperture 9 of an electron collector is significantly curved in the region of a magnetic lens of "dispersive" medium 4 as indicated by 8. If the electrons are accelerated at a relatively high voltage, the influence by the magnetic field on the flow of electrons is small, and the path of the electron beam to the aperture of the collector is curved at a small degree. The flow of electrons passing through the center of the magnetic lens will not be curved, and therefore it is used as a reference beam 6. Different dispersive beams 8 and 8' interfere with the reference beam 6, respectively. Thus, pieces of holographic informations are obtained by controlling the accelerating voltage.

The resolving power of the conventional electron microscope is limited by the aberration of the magnetic lens, and it is very difficult to discern an object having diameter of a 10 or less angstrom.

This invention, however, makes use of the refractive effect of the magnetic lens to produce the image of an object, and the aberration of the magnetic lens has no adverse influence on the resolving power. Therefore, the power of resolution is substantially improved.

Figure 8:
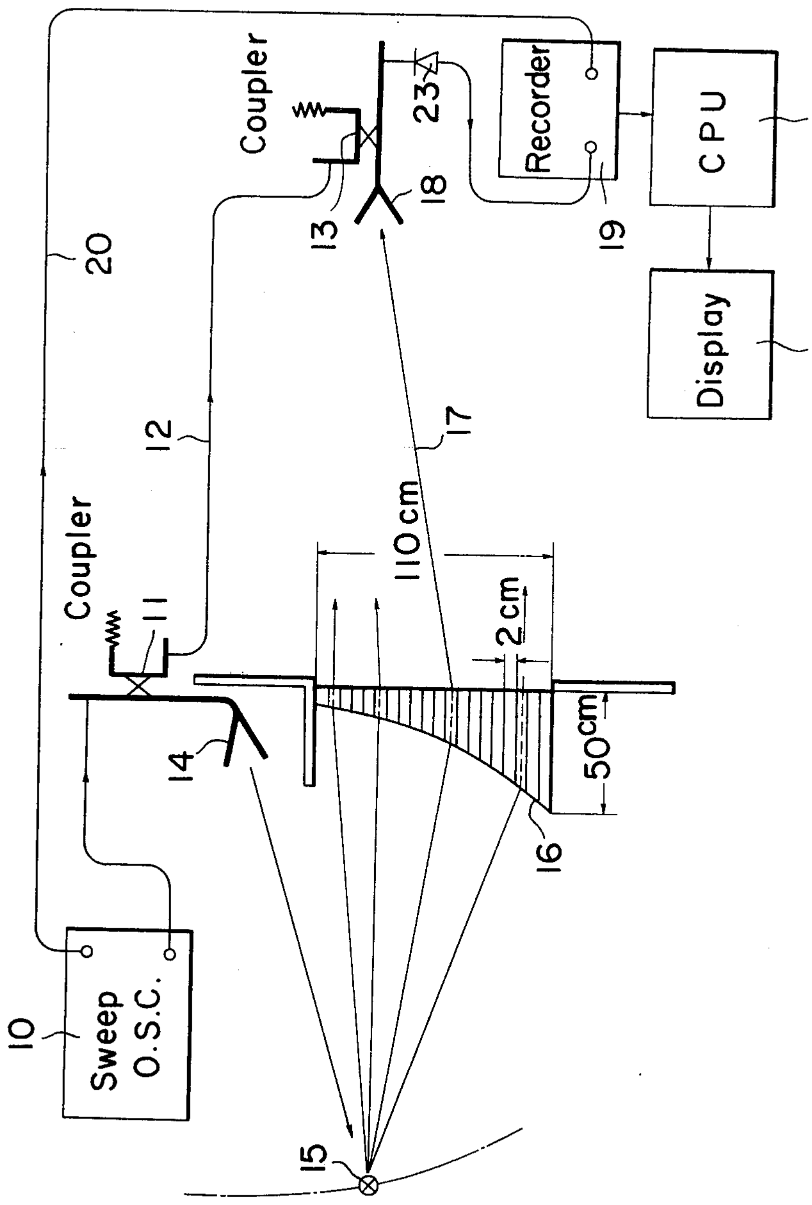
FIG. 8 is a structural view concretely showing one of the systems according to the present invention.

Referring to FIG. 8, there is shown an embodiment using a microwave at X-band region (3-cm wave length) to discern a two-dimensional object. The system in the drawing was actually constructed. As a "dispersive" medium a metal-plate lens was used. A sweep oscillator 10 generated a microwave, which was separated at the ratio of 1 to 9 by a coupler 11. A small separate portion (1/10) of the output from the coupler 11 was directed to another coupler 13 via a coaxial cable 12. The remaining large portion (9/10) of the output from the coupler 13 was directed to an object 15 via transmitting antenna 14. The microwave was scattered by the object 15, and some of the so-scattered waves were caught and bent by a "dispersive" medium 16. A particular dispersive wave 17 was selectively received by a receiving antenna 18, and this particular dispersive wave was mixed with the reference wave and detected at the detector 23. The output from the detector 23 was synchronized with a synchronizing signal which was supplied by an oscillator 10 via a coaxial cable 20. Then the output was plotted against frequency in a recorder 19. The so-recorded output was processed by an electronic computer 21, and was displayed on an indicator 22. In the drawing, the dot-and-dash line on the object indicates an equi-phase plane. This is an ellipsoid of revolution which has two focuses at the same positions as the transmitting and receiving antennas. Stated otherwise, wherever the object may be moved on the equi-phase plane, the length of the line extending from the transmitting antenna to the receiving antenna via the object of the equiphase plane remains constant. If it were not for the "dispersive" medium, the interference patterns of the scattered and reference waves would be the same at all points on the equiphase plane, and these interference patterns could not be separated from each other. The use of the "dispersive" medium permits the separation of the interference patterns. The refractory index $n$ of the metal-plate lens is given by:

$$n = \sqrt{1 - \left(\frac{\lambda}{2a}\right)^2}$$

wherein "λ" is the wave length, and $a$ is a metal plate-to-metal plate distance. The metal plate lens used was a stack of laminations.

Each lamination of different length was a 20mm thick piece of polystyrol having aluminum foils applied to the opposite surfaces of the piece. The thickness $l$ of the metal plate lens is given by:

$$l = A \cdot y_o^2$$

wherein $y_o$ is the distance from the axis of the lens, and $A$ is the parameter of the lens. The parameter of the lens used in this embodiment was 1/400 $cm^{-1}$. The object was a sphere 15mm in diameter. The distance from the transmitting antenna to the object was 20 cm, whereas the distance from the object to the medium was 30 cm.

Figure 9:
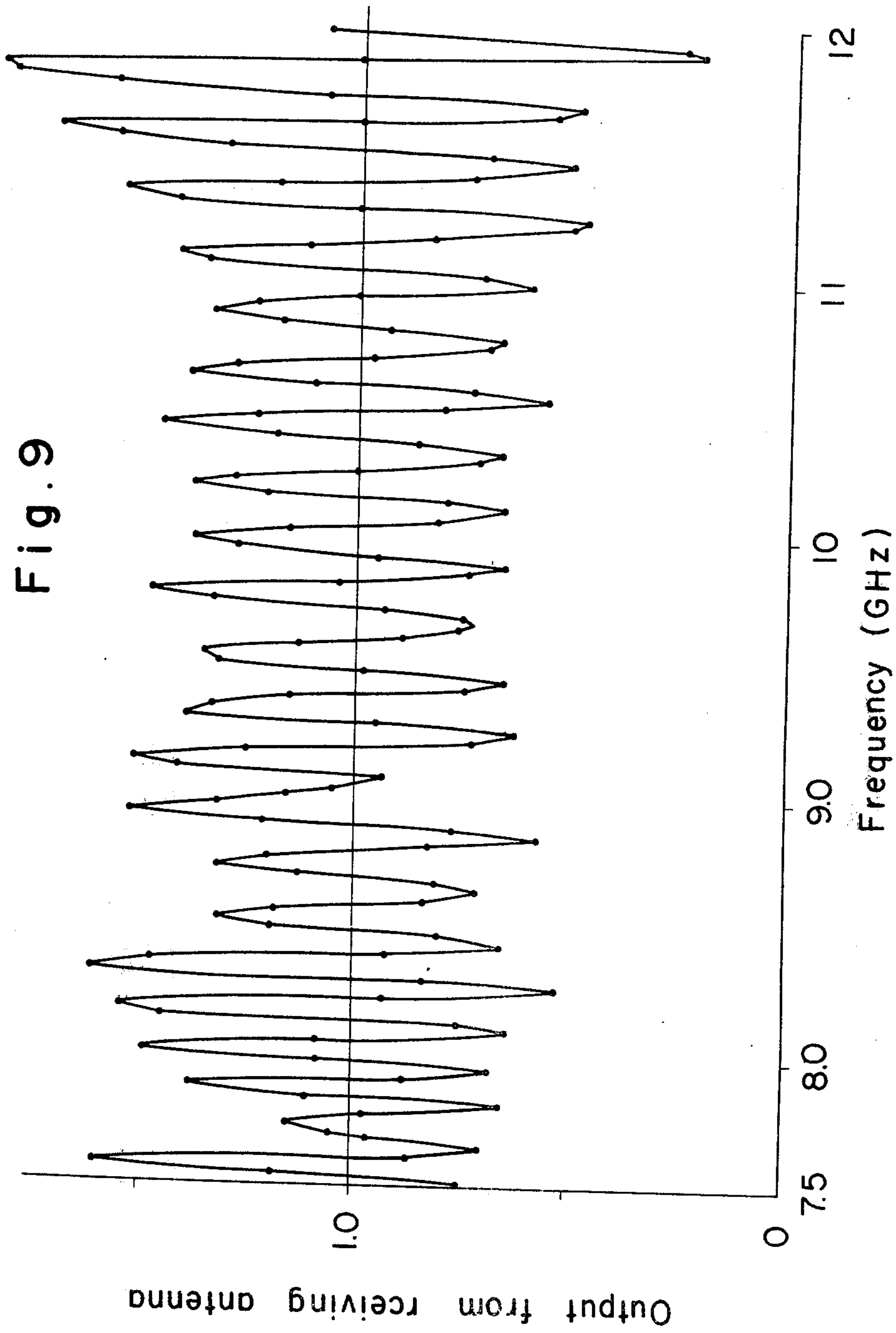
FIG. 9 is a characteristic view showing an output from the receiving antenna of the system shown in FIG. 8.
Figure 10:
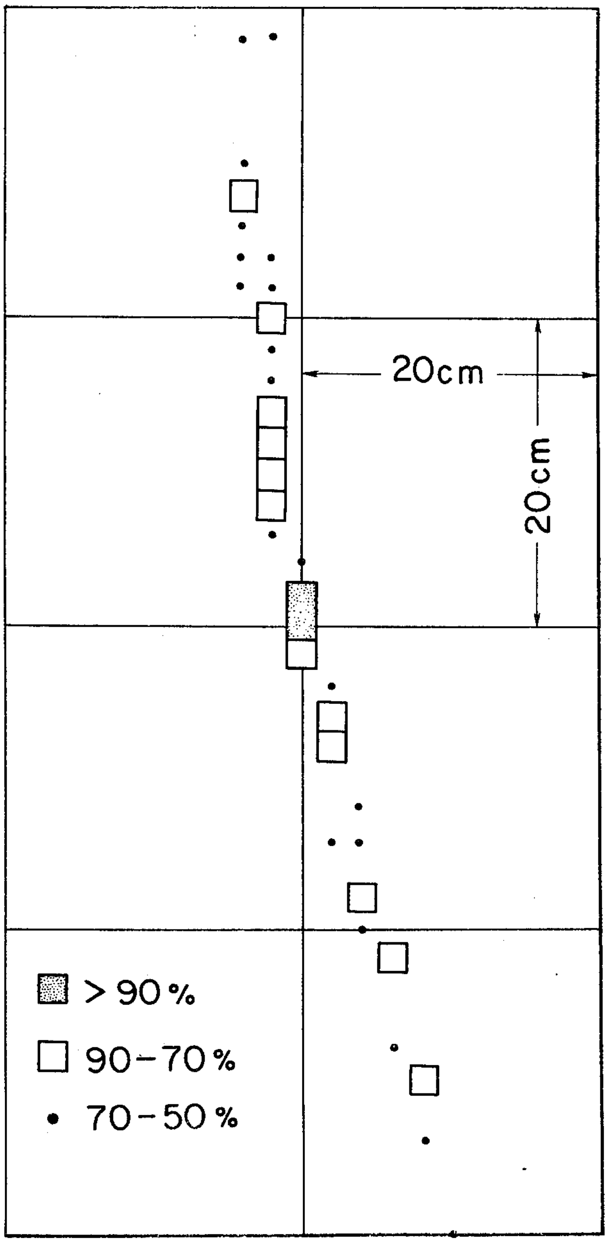
FIG. 10 is a classification view showing images reproduced on the basis of FIG. 9.

The frequency of the microwave from the transmitting antenna was swept over the range from 7.5 to 12.0 GHz. As a result the refractory index varied in the range from 0 to 0.78, and the output from the receiving antenna 18 varied with frequency, as shown in FIG. 9. The output was recorded, and an electronic computer processed the so-recorded output according to the equation (6), thus producing an image of the object as shown in FIG. 10. The blotted rectangle at the center is the most enhanced production of image. This shows the image is produced at a position corresponding to the object position.

In the embodiments above described, the refraction of the wave was varied by controlling the frequency of the wave, but the same effect is caused by changing the refractory index of the medium per se in an electric or mechanical way.

The above description is made with respect to the discernment of a point object. As shown in FIG. 5, however, a three dimensional object can be equally discerned according to this invention. In FIG. 5, a wave is directed to and scattered by a three dimensional object. The so-scattered wave impinges on the medium, and the dispersive waves passing through the medium at selected position thereof impinge on the receiving antenna at the same time. Accordingly, the output of the receiving antenna represents the resultant of the dispersive waves from the whole object. The result is processed by an electronic computer, and the whole object can be discerned.

As is apparent from the above, an object discerning method according to this invention uses a microwave, a millimeter wave, an ultrasonic wave and other spatial waves. In the conventional antenna-sweeping method, it takes at least 4 or 5 seconds before completing a single sweeping of the receiving antenna over the whole surface of the medium, and still disadvantageously the sweeping requires a tedious operation, and the array structure composed of numerous receiving antennas is inevitably too expensive. In contrast to this, in an object discerning method according to this invention, a single sweeping of frequency will be completed in ten milliseconds, and the structure is simple and much less expensive, making it possible to discern a three-dimensional object in an accurate and quick way.

What is claimed is:

1. An object discerning apparatus comprising: a stationary source for generating a wave at variable frequency; an asymmetric, dispersive medium to cause an object-scattered wave to refract in passing through the medium; a stationary detector to receive the scattered and refracted wave and means at the detector to cause the received wave to interfere with a reference wave whereby in the course of wave propagation to said stationary detector said scattered wave is refracted to a different degree by changing the frequency of the wave before detection.

2. An object discerning apparatus according to claim 1, wherein said source for generating wave at variable frequency comprises a microwave-sweep oscillator, and said medium is composed of an array of wave guides.

3. An object discerning apparatus according to claim 1, wherein said source for generating wave at variable frequency comprises an ultrasonic sweep generator and a barium titanate piezoelectric element, and said medium is a diffraction grating.

4. An object discerning apparatus comprising: a stationary source for generating a wave at variable frequency; an asymmetric medium through which the wave scattered by said object passes, said medium being responsive to external signals for changing its refractory index; signal means to change the refractory index of said asymmetric medium; a stationary detector to receive the scattered wave after it passes through said medium; and means at the detector to cause the received wave to interfere with a reference wave.

5. An object discerning apparatus according to claim 4, wherein said source for generating a wave at variable frequency comprises a microwave sweep oscillator, and said medium is composed of an array of wave guides.

6. An object discerning apparatus according to claim 4, wherein said source for generating a wave at variable frequency comprises an ultrasonic wave generator and a barium titanate piezoelectric element and said medium is a diffraction grating.

7. A method of discerning an object, comprising the steps of generating a coherent wave from a stationary wave source, directing the wave to the object to cause scattering of the wave at the object, passing the scattered wave through a medium sequentially refracting the wave propagated in the medium to a different degree to obtain a sequence of different refracted waves, and causing the different refracted waves to be detected at a stationary detecting station and to be brought into interference at the detecting station with a reference wave.

8. The object discerning method of claim 7, wherein the medium is an asymmetric dispersive medium and the frequency of the wave is sequentially changed to refract the wave to a different degree.

9. The object discerning method of claim 7, wherein the medium is an asymmetric dispersive medium responsive to external signals for changing the refractive index thereof, and applying sequential signals to the medium to change the refractive index and thereby to cause sequential refraction of the wave to a different degree.

10. The object discerning method of claim 7, wherein the wave is a microwave.

11. The object discerning method of claim 7, wherein the wave is a millimeter wave.

12. The object discerning method of claim 7, wherein the wave is an ultrasonic wave.

13. The object discerning method of claim 7, wherein the wave is an electron beam.

* * * * *